United States Patent [19]

Kurando et al.

[11] Patent Number: 4,620,782
[45] Date of Patent: Nov. 4, 1986

[54] AUTOMATIC DOCUMENT FEEDER

[75] Inventors: Shigeo Kurando, Takatsuki; Katsumi Amakawa, Yamatotakada; Yoshizo Kawamori, Fujiidera, all of Japan

[73] Assignee: Mita Kogyo Kabushiki Kaisha, Japan

[21] Appl. No.: 631,678

[22] Filed: Jul. 17, 1984

[30] Foreign Application Priority Data

Jul. 18, 1983 [JP] Japan ............................... 58-132056
Jul. 18, 1983 [JP] Japan ............................... 58-132057
Jul. 18, 1983 [JP] Japan ............................... 58-132058

[51] Int. Cl.$^4$ ........................... B65H 5/02; B65H 7/14
[52] U.S. Cl. ................................. 355/14 SH; 271/3; 271/259; 271/265; 271/275
[58] Field of Search ..................... 271/3, 3.1, 4, 9, 246, 271/275, 10, 258, 259, 264, 265, 266, 263; 355/14 SH

[56] References Cited

U.S. PATENT DOCUMENTS

| | | | |
|---|---|---|---|
| 4,170,414 | 10/1979 | Hubert et al. | 271/259 X |
| 4,281,919 | 8/1981 | Nomura et al. | 355/14 SH |
| 4,332,462 | 6/1982 | Yagasaki et al. | 271/263 X |
| 4,433,909 | 2/1984 | Goes in Center et al. | 355/75 |
| 4,491,929 | 1/1985 | Ikoma et al. | 271/258 X |

FOREIGN PATENT DOCUMENTS 0022957 1/1981 European Pat. Off. .
2941502 4/1980 Fed. Rep. of Germany .

OTHER PUBLICATIONS

Hubbard, J. H. et al., "Copier Controls", IBM Technical Disclosure Bulletin, vol. 19, No. 5, Oct. 1976, p. 1589.

Primary Examiner—Bruce H. Stoner, Jr.
Assistant Examiner—Lawrence J. Goffney, Jr.
Attorney, Agent, or Firm—Beveridge, De Grandi & Weilacher

[57] ABSTRACT

An automatic document feeder, comprising a document supply section for supplying documents one by one toward a document platen, a belt feed section for transferring a supplied document to a predetermined position on the document platen to enable an image forming operation, and a document discharge section for discharging onto a document discharge tray a document fed from the belt feed section upon completion of the image forming operation, is attached so that it is upwardly turnable with respect to the document platen so as to enable manual and automatic document settings to be made selectively. Further, the automatic document feeder is designed to discriminate between manual and automatic document setting modes and to detect the presence or absence of a document at a predetermined position in the automatic document feeder when the automatic document setting mode is selected. The automatic document feeder is driven with a predetermined timing for the setting of documents.

6 Claims, 14 Drawing Figures

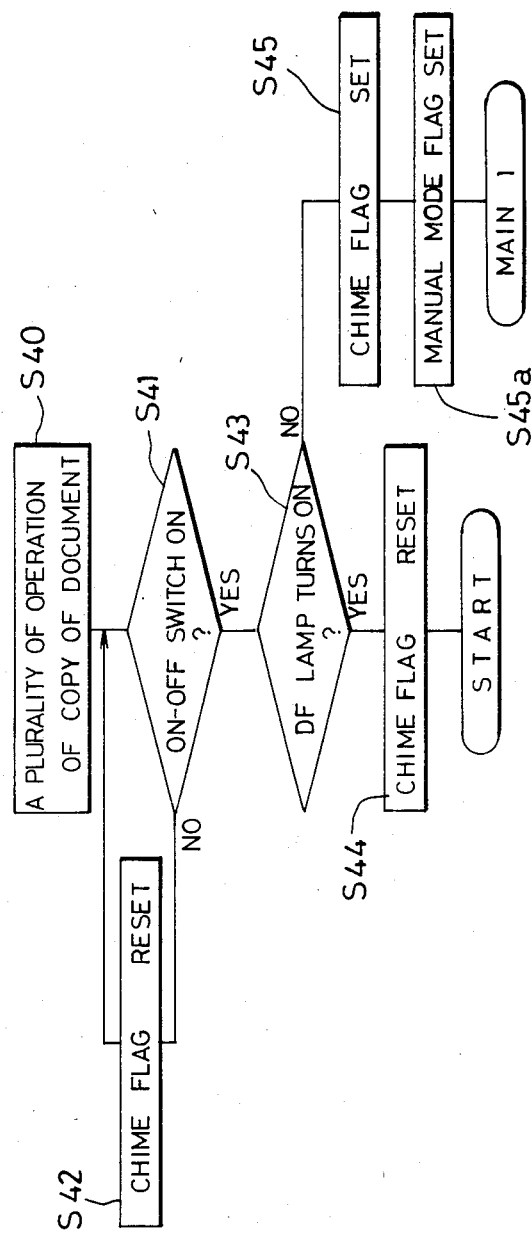

AUTOMATIC DOCUMENT FEEDER

BACKGROUND OF THE INVENTION

This invention relates to an automatic document feeder and more particularly it relates an automatic document feeder for use with an image forming apparatus, such as a copying machine or facsimile system, which forms images corresponding to document images, said feeder being designed not only for manual setting of documents on the document platen but also for automatic setting of documents.

In copying machines which have heretofore been in wide use, the operator performs a copying operation by first upwardly turning the document hold-down platen which covers the upper surface of the document platen to set a document at a predetermined position on the document platen, and then restoring the document hold-down platen to hold the document between the document platen and the document hold-down platen, whereupon he actuates the copying machine for copying operation.

Thus, the upward turning and restoration of the hold-down platen must be effected for each exchange of documents and involve the creation of an air pressure which often causes the inconvenience of the document deviating from the predetermined position to the extent of leading to a failure in providing a desired document image at a desired position; for example, the document image is formed at an off-center position on the copying paper sheet or only part of the document image is formed on the copying paper sheet. Further, since the document hold-down platen must be turned for each exchange of documents, the operation is complicated, which is another inconvenience. On the other hand, there is an advantage that even if the documents are different in thickness, they can be set with ease.

In recent years, for automatic setting of documents, there has been provided a copying machine with a document feeder installed above the document platen.

With such copying machine, the labor of setting a document can be greatly reduced, but for the time taken for the copying-ready state to be established after the power for the copying machine is turned on, (e.g., for the time required for the fixing heat roller to be heated to a predetermined temperature set as the fixation temperature) the operator has to stand by in front of the copying machine, a fact which reduces the efficiency of copying work and hence the efficiency of the overall office work including copying work.

Further, with consideration given to the advantages of the aforesaid two types of copying machines, there has been provided a copying machine with the document feeder adapted to turn upwardly with respect to the document platen. With this machine, however, after a document has been manually set, if other documents are to be automatically set by the document feeder, this will sometimes result in an inconvenience; since the manually set document, whether thin or thick, will be automatically discharged, if it is a thick one, then the discharge rollers can be damaged or jammed with the thick document. Another inconvenience is that although an automatically set document is automatically discharged upon completion of image forming operation, the manually set document will stay forever on the document platen unless it is removed by the operator.

Further, in such image forming apparatus as the facsimile system, if the same document feeder as in the aforesaid copying machine is used, the same inconveniences as described above will occur.

An object of this invention is to provide an arrangement wherein upon the lapse of the time required for the image forming apparatus to be ready for image forming operation (hereinafter referred to as the warm-up time), document feed is automatically effected so that an image forming operation for at least the first document can be automatically performed while the operator, away from the image forming apparatus, is doing another job.

Another object of the invention is to actuate the automatic document feeder only when there is a document set in the copying machine.

Another object of the invention is to ensure that in discharging a document, the discharge section does not get damaged or jammed with the document.

Another object of the invention is to prevent the automatic document feeder from being damaged or jammed with a document without decreasing the speed at which a document is set by the automatic document feeder.

A further object of this invention is to indicate the damage preventing state and document jam preventing state of the document feed section to the operator.

Another object of the invention is to provide an arrangement wherein when a document is manually set, if the operator forgets to remove the document, this situation is noticed to the operator to remind him of having forgotten to remove the document.

This invention provides an automatic document feeder which is upwardly turnable with respect to the document platen and which, after transferring a document to a predetermined position, discharges the document, said feeder having mode discriminating means for discriminating between manual and automatic document setting modes, document detecting means for detecting the presence or absence of a document at a predetermined position, and control means for driving the automatic document feeder with a predetermined timing.

The automatic document feeder may have a motor of its own for document transfer or a power transmission mechanism which transmits the driving force of the prime mover section of the image forming apparatus itself only when the automatic document setting mode is selected. The mode discriminating means may be of a type which discrminates modes as by keying operation on the document feeder or of a type which discriminates modes on the basis of whether or not a turning operation is applied to the automatic document feeder. As for the document detecting means, it is generally of the optical type using photoelectric elements for detection, but it may be of the mechanical type using limit swtiches or the like. Further, the control means may be an electric circuit which controls the timing and duration with which the motor is operated or it may be another electric circuit which controls the timing and duration with which a solenoid clutch forming a portion of the drive force transmission mechanism is operated.

BRIEF DESCRIPTION OF THE DRAWINGS

FIGS. 8 through 14 are flowcharts showing the operational procedures of said control circuit.

DESCRIPTION OF THE PREFERRED EMBODIMENTS

Figure 1:
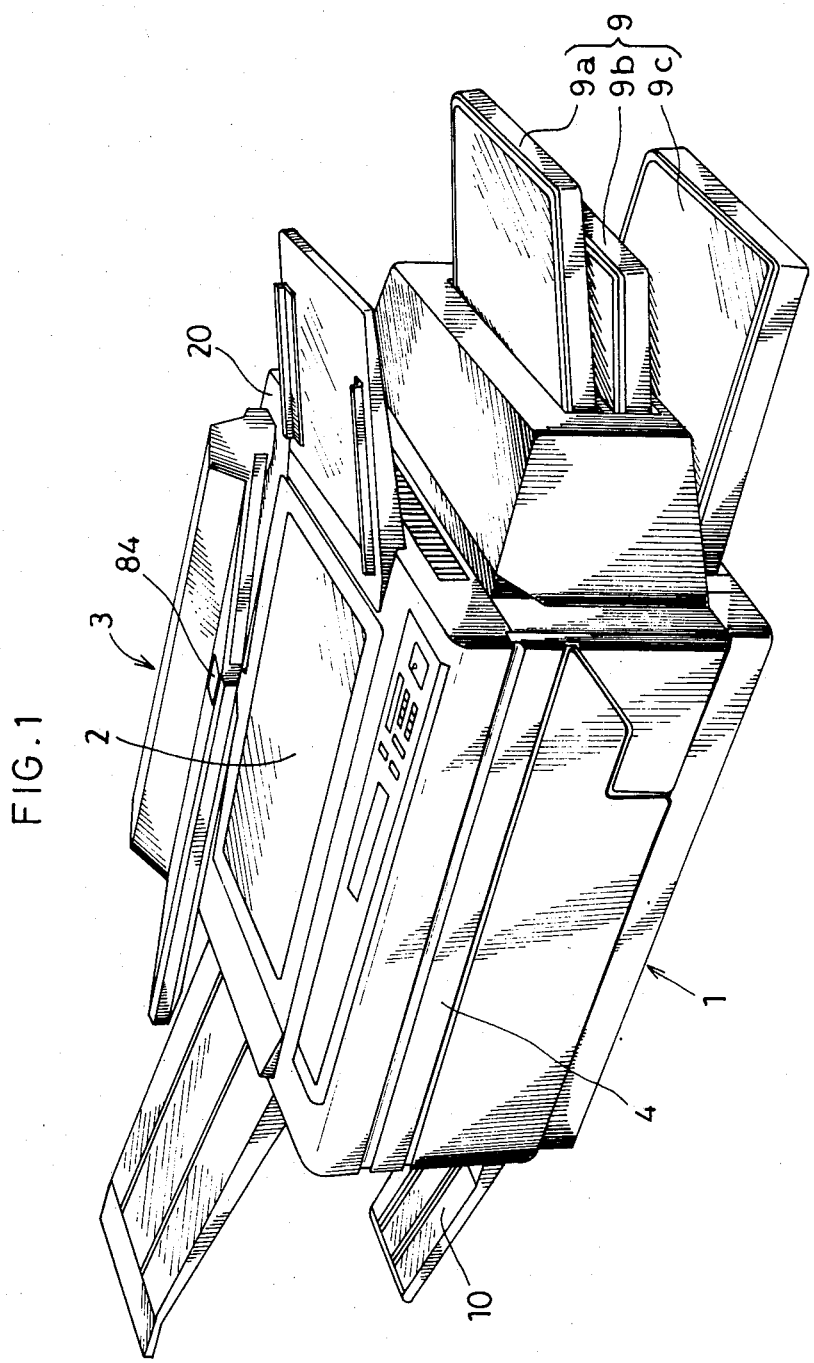
FIG. 1 is a perspective view of a copying machine in its entirety having an autmtic document feeder according to an embodiment of the present invention (with the atuomatic document feeder shown in its opened state)
Figure 2:
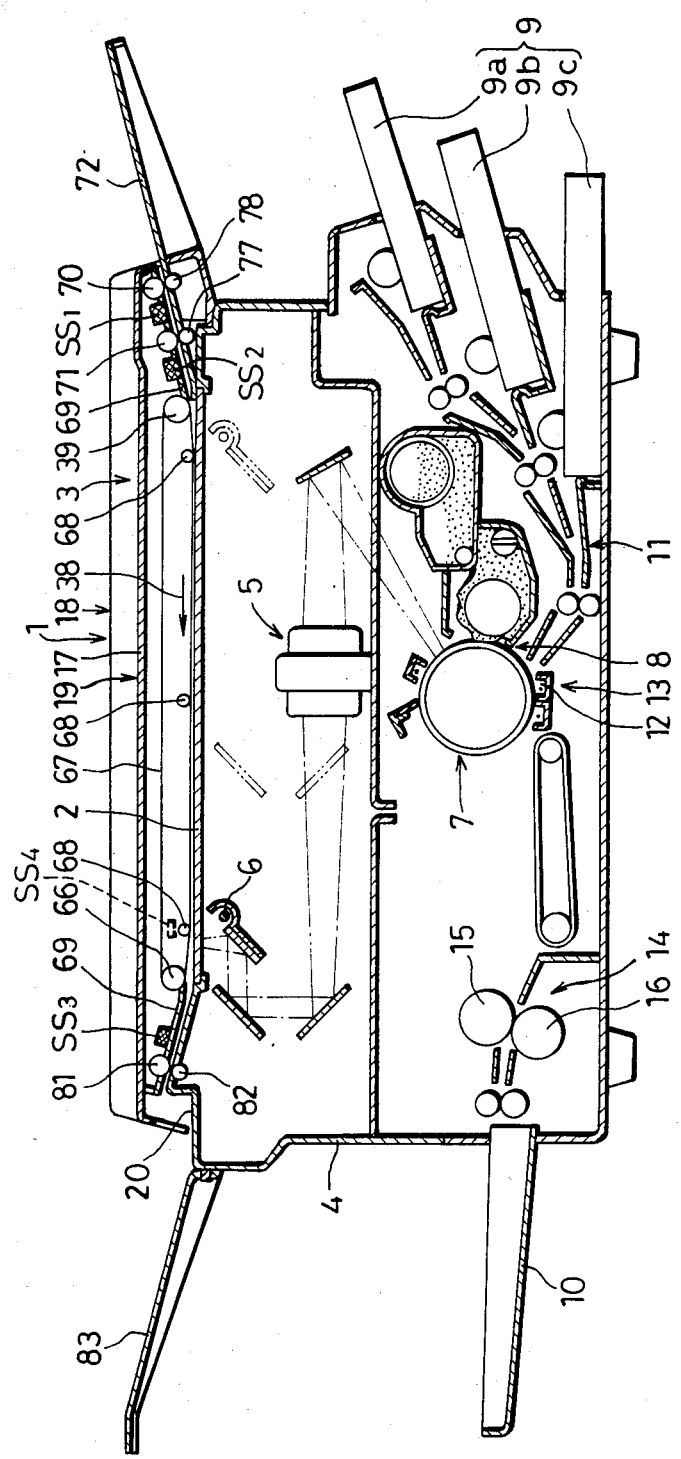
FIG. 2 is a schematic sectional side view of said document feeder in its closed state.

First, an automatic document feeder according to an embodiment of the invention and a copying machine which can be provided therewith will be outlined with reference to FIGS. 1 and 2. In these figures, the copying machine 1 comprises an automatic document feeder 3 attached to be upwardly turnable with respect to a document platen 2 in the form of a transparent plate for supporting a document during copying operation, an optical system 5 contained in a cover 4, a light source 6 movable along the document platen 2, a photoreceptor 7 whereby a document image passing through the optical system 5 as the surface of a document is scanned by light source 6 is converted into a latent electrostatic image, a developing device 8 for visualizing the latent electrostatic image produced on the photoreceptor 7 by applying a toner thereto, a transfer passage 11 along which copying paper sheets contained in one or a plurality of paper supply cassettes 9a, 9b ... transferred via the surface of the photoreceptor 7 to a discharged-paper tray 10, an image transfer section 13 where the toner image on the photoreceptor 7 is transferred onto the copying paper sheet by an image transfer corona discharger 12 in said transfer passage 11, and a fixing device 14 including a heat roller 15 and a press roller 16 for heating the copying paper sheet peeled off the photoreceptor 7 with the toner image transferred thereto and fixing the toner image on the copying paper sheet.

The automatic document feeder 3 in its entirety is covered over its upper surface with a cover assembly 17 and comprises a drive section 18 including a motor M to be later described, and a transfer section 19 including a belt 67 whose thickness is smaller than in said drive section 18, to be later described, said feeder being attached to the side associated with the drive section 18 (i.e., to the rear portion of the upper surface of the copying machine) as by an unillustrated hinge construction above the upper surface 20 of the copying machine so that it is upwardly turnable; thus, the automatic document feeder will be opened and closed with respect to the document platen 2 by said turning operation.

Figure 3:
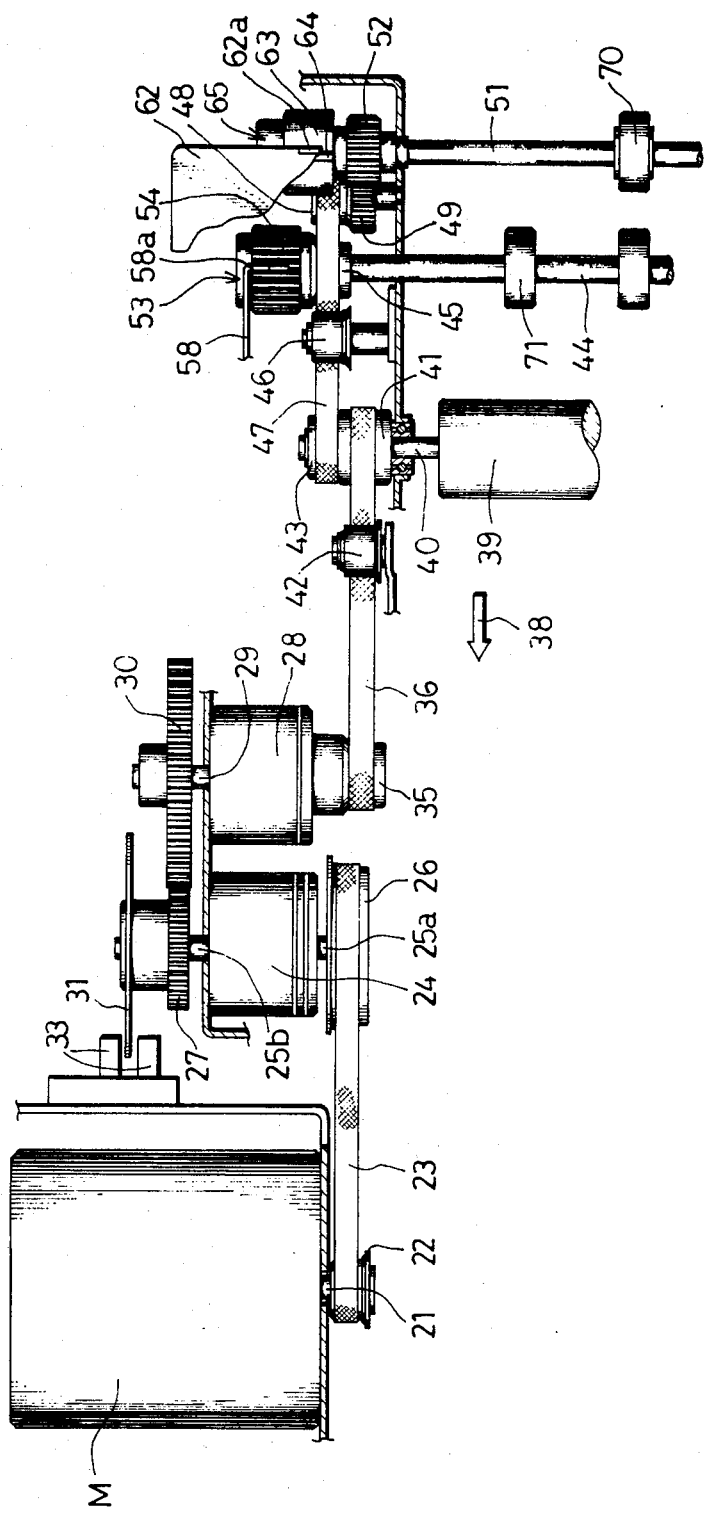
FIG. 3 is a plan view showing the document supply section of the document feeder.
Figure 4:
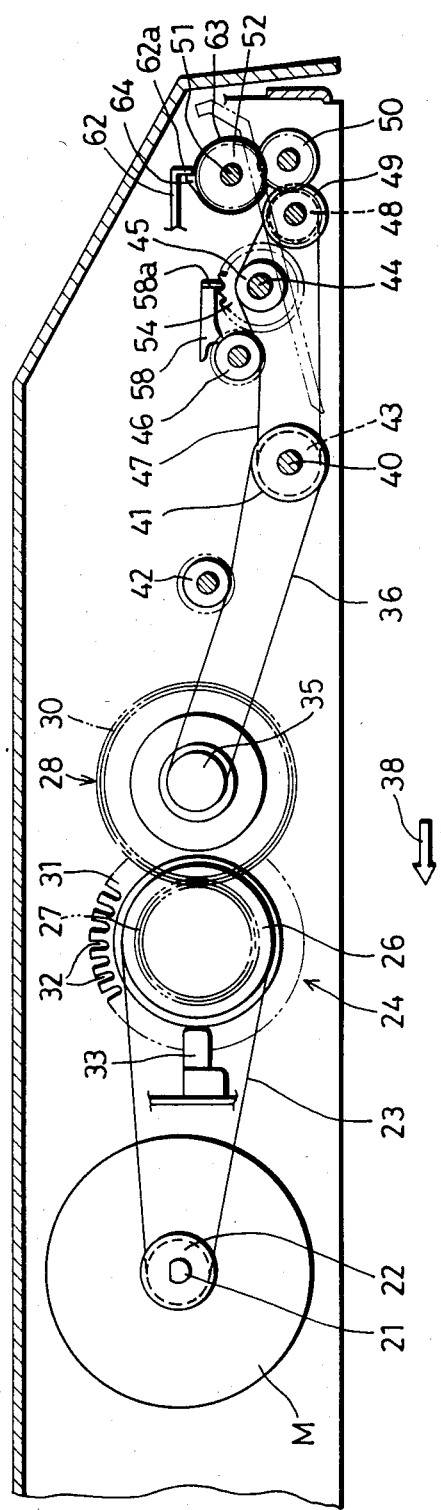
FIG. 4 is a side sectional view of said document supply section.

Contained in said drive section 18, as shown in FIGS. 3 and 4, is the motor M, which drives the automatic document feeder 3 in accordance with the operational conditions for the copying machine, and a belt 23 entrained around a pulley 22 fixed on the drive shaft 21 of the motor M by any suitable means is entrained around a pulley 26 fixed on the input shaft 25a of a solenoid clutch 24.

The motor M is attached to a bottom plate 69 attached to said cover assembly 17, and a gear 27 fixed on the output shaft 25b of the solenoid clutch 24 attached to the bottom plate 69 meshes with a gear 30 fixed on the input shaft 29 of a solenoid brake 28 disposed side by side with the solenoid clutch 24. A slitted plate 31 attached to the output shaft 25b coaxially with the gear 27 is substantially circular and has a number of slits 32 (FIG. 4) equispaced around the outer periphery thereof, and a photointerrupter 33 receiving the slitted portion to form a pulse generator is installed, so that electric pulses determined by the number of slits passing through the photointerrupter 33 are induced in the latter, whereby the rpm of the motor M is detected.

A belt 36 entrained around a pulley 35 fixed on the output shaft of said solenoid brake 28 is entrained through a tension pulley 42 around a pulley 41 fixed on the shaft end portion 40 of a belt drive shaft 39 extending at right angles to the direction of document transfer indicated by arrow 38 in said transfer section 19. A belt 47 entrained around a pulley 43 coaxial with the pulley 41 fixed on said shaft end portion 40 is an endless belt which extends in contact with the periphery of a pulley 45 mounted on the shaft end portion of a feed roller shaft 44 through a spring clutch 53 to be later described and is then entrained around an intermediate pulley 48 which is freely rotatable, and finally returns to the pulley 43; the numeral 46 denotes a tension pulley for this belt.

The intermediate pulley 48 is integral with a gear 49 which meshes with a gear 52 which is mounted on the shaft end of a supply roller shaft 51 (parallel to the belt drive shaft 39) disposed opposite to the belt drive shaft 39.

The spring clutch 53 together with said pulley 45 is mounted on the shaft end of the feed roller shaft 44, and the rotation of said pulley 45 is transmitted to the feed roller shaft 44 through said spring clutch 53.

An actuator for a solenoid SOL$_1$ (FIG. 7) attached to the bottom plate 69 is connected to a lever 58 through an unillustrated link, so that as the solenoid SOL$_1$ is actuated, the lever 58 swings to cause its pawl 58a to disengage or engage the ratchet wheel 54 of the aforesaid spring clutch 53, thereby rotating or braking the ratchet wheel so as to turn on and off the rotation of the feed roller shaft 44.

Further, an actuator for a solenoid SOL$_2$ (FIG. 7) installed on the bottom plate 69 in opposed relation to the solenoid SOL$_1$ is connected to a swingable lever 62 through an another unillustrated link, and the locking element 62a of the lever 62 will engage or disengage the cam 63 of a spring clutch 65 mounted on the shaft end of said supply roller shaft 51 coaxially with the gear 52.

The gear 52 and supply roller shaft 51 are interconnected through the spring clutch 65. When the locking element 62a of the lever 62 engages the pawl 64 of the cam 63 to prevent rotation of the cam 63, transmission of the rotation of the gear 52 to the supply roller shaft 51 is prevented.

As shown in FIG. 2, a wide white document transfer belt 67 is mounted in tensioned condition between a driven shaft 66 parallel to said belt drive shaft 39 and disposed downstream in the direction of document transfer indicated by arrow 38 and the belt drive shaft 39 and is entrained therearound, and in the intermediate region there are a plurality of press rollers 68 for urging the belt 67 against a document.

The aforesaid belt drive shaft 39, feed roller shaft 44, supply roller shaft 51, press roller 68, and a document discharge roller 81 to be later described, together with the motor M, solenoid clutch 24, and solenoid brake 28 are supported by the bottom plate 69 (FIGS. 2 and 5) attached to the cover assembly 17 through suitable bearings.

Figure 5:
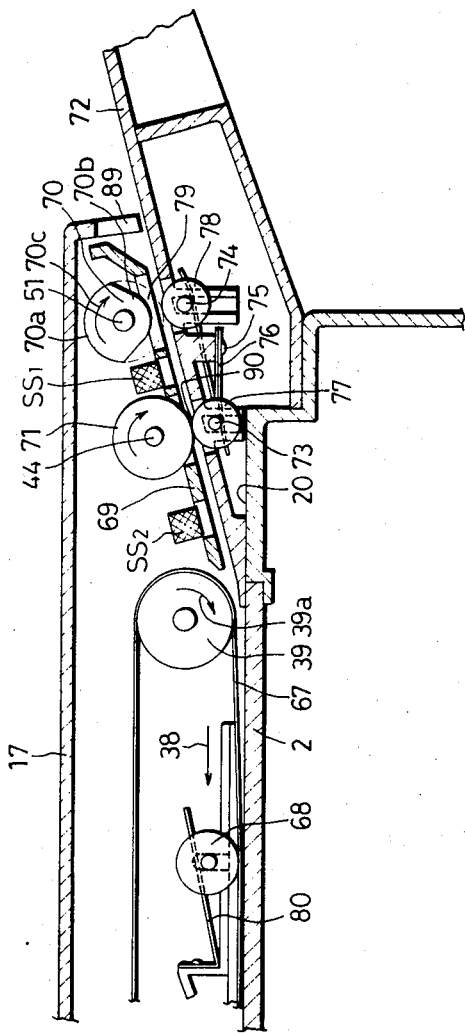
FIG. 5 is a side sectional view showing the construction of said document supply section and of a belt feed section.

The aforesaid supply roller shaft 51, as shown in FIG. 5, has a plurality of supply rollers 70 which are a kind of cams, and each supply roller 70, as is clear from the figure, comprises a large radius arcuate portion 70a and a small radius arcuate portion 70b. A plurality of feed rollers 71 attached to the feed roller shaft 44 are each in the form of a short cylinder.

In the document supply section on the upper surface 20 of the cover 4 of the copying machine 1, as shown in FIGS. 1, 2, and 5, a document supply tray 72 for placing thereon documents to be supplied is installed at some angle of inclination with respect to the document platen 2. Two press roller shafts 73 and 74 vertically slidably attached to the lower surface of said document supply tray 72 are disposed immediately below the feed roller shaft 44 and supply roller shaft 51, respectively, and are urged toward the feed roller shaft 44 or the supply roller shaft 51 by a plate spring 76 fixed to the lower surface of the document supply tray 72 by a bolt 75. The press roller shafts 73 and 74 have a plurality of rotatable press rollers 77 and 78 attached thereto in opposed relation to said feed rollers 70 and supply rollers 71, respectively.

Thus, since the feed rollers 71 are truly cylindrical, the press rollers 77 opposed to the feed rollers 71 are always in contact with the outer peripheries of the feed rollers 71 and are driven for rotation with the feed rollers 71, while since the supply rollers 70 are sectorial, the press rollers 78 associated with the supply rollers 70, depending upon their angular position, come in or out of contact with the outer peripheries of the supply rolles 70.

When the large radius arcuate portions 70a of the supply rollers 70 come around to the lower position, they contact the press rollers 78 and drive out a document nipped therebetween in the direction of rotation (indicated by arrow 70c), but when the other portions, i.e., the small radius arcuate portions 70b come to be opposed to the press rollers 78, there is a clearance 79 defined therebetween, so that there is no force produced to drive out a document.

The press rollers 68 associated with the belt 67 are also resiliently urged by a plate spring 80 to press the belt 67 against the document platen 2, as shown in FIG. 5.

Further, as shown in FIG. 2, the bottom plate 69 has a document discharge roller 81 disposed parallel to the belt driven shaft 66 downstream in the direction of document transfer indicated by arrow 38, and a rotatable press roller 82 disposed therebelow is resiliently pressed against the document discharge roller 81.

As is clear from FIGS. 1 and 5, a first optical sensor $SS_1$ for detecting the presence or absence of a document being fed toward the feed rollers 71 by the supply rollers 70 is attached to the bottom plate 69 between said feed roller shaft 44 and said supply roller shaft 51, while a second sensor $SS_2$ is installed between the belt drive shaft 39 and the feed roller shaft 44.

Further, as shown in FIG. 2, a third sensor $SS_3$ is attached to the bottom plate 69 between the belt driven shaft 66 and the document discharge roller 81. Each sensor may be a refection type optical sensor having the function of detecting the presence or absence of a document be detecting reflected light from the document moving immediately therebelow, or an optical sensor using a light emitter and a light receiver, or it may be a limit switch.

The belt driven shaft 66 and document discharge roller 81 are interconnected by an unillustrated belt or the like so that they are rotated at the same speed or so that the document discharge roller 81 is rotated at a little higher speed than that of the belt driven shaft.

A document discharge tray 83 disposed downstream of said document discharge roller 81 is removably attached to the lateral surface of the aforesaid cover 4 covering the copying machine.

It is desirable that the aforesaid pulleys 22, 26, 35, 41 and 43 be toothed pulleys, in which case the mating belts 23, 36, and 47 are timing belts.

In addition, the belt 67, belt drive shaft 39 which drives it, belt driven roller 66, feed roller shaft 44, supply roller shaft 51, document discharge roller 81, press roller 68, and first through third sensors $SS_1$ through $SS_3$ are contained in a space defined by the cover assembly 17 surrounding the automatic document feeder 3 and by the bottom plate 69 attached thereto, and they will be turned as a whole when the cover assembly 17 is turned around the unillustrated hinges disposed adjacent to the drive section 18, as described above; this turning movement of the automatic document feeder in its entirety is detected by an unillustrated on-off switch such as a limit switch, it being so arranged that the automatic document transfer will be performed only when the automatic document feeder 3 is in its closed state.

Figure 6:
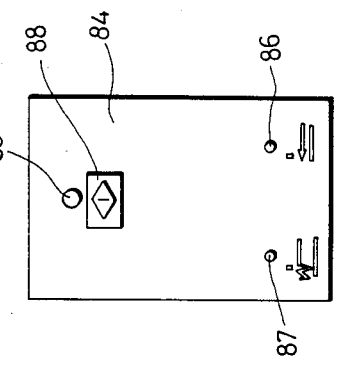
FIG. 6 is a front view of an operator panel with which the operator operates said document feeder.

An indicator (hereinafter referred to as DF lamp) 85 which indicates an automatic document setting mode selection state, an indicator (hereinafter referred to as setting lamp) 86 which indicates a state requiring the setting of documents or like states, and an indicator (hereinafter referred to as jam lamp) 87 which indicates a document jam state are installed on an operator panel 84 on the upper surface of the cover for the document feeder 3, as shown in FIG. 6. The DF lamp 85 can be lit by the operator depressing an automatic document setting mode selection switch (hereinafter referred to as DF switch) 88 to establish an automatic document feed state.

The signal transmission path of the control circuit of the document feeder will now be described with reference to the block diagram shown in FIG. 7.

Figure 7:
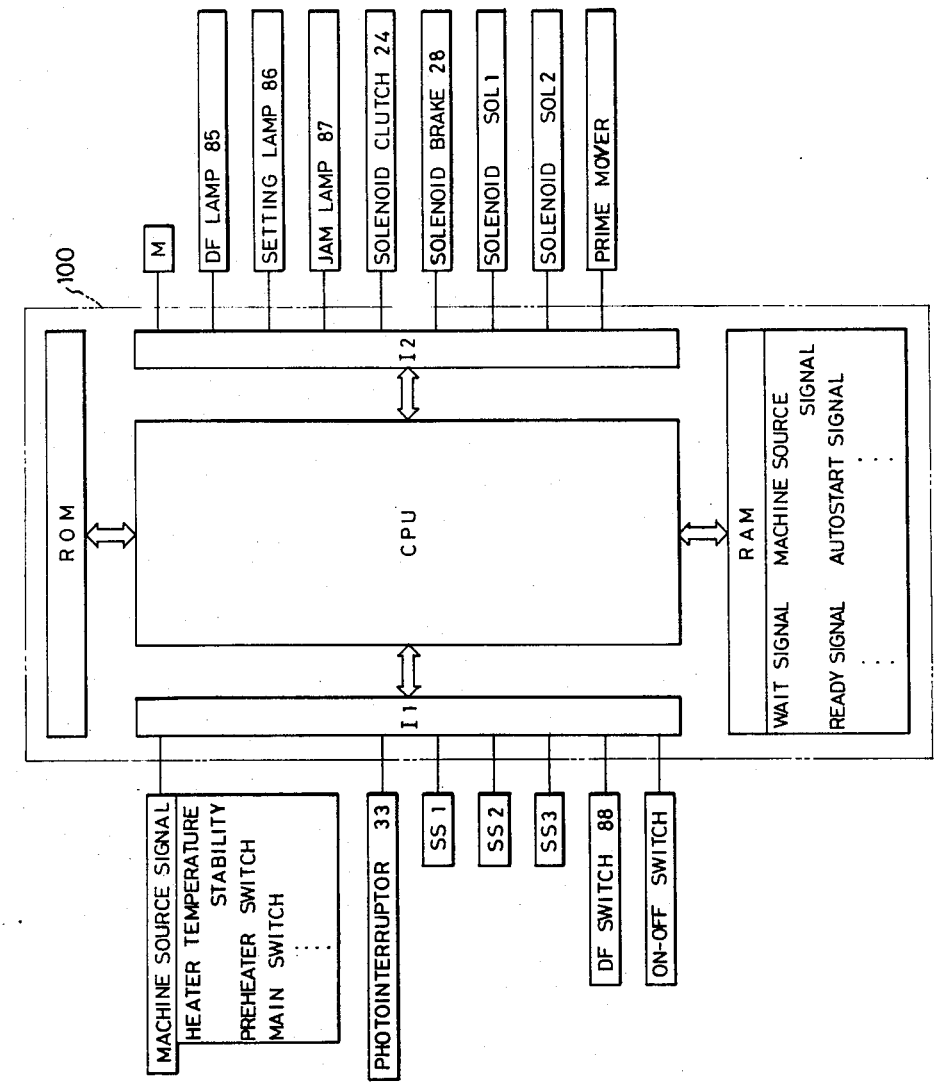
FIG. 7 is a block diagram showing a signal transmission system in a control circuit used in the automatic document feeder of the invention.

In FIG. 7, the numeral 100 denotes a known microcomputer inlcuding a ROM and a central processing unit CPU which takes in external data from an input interface circuit $I_1$ in accordance with a program written in said ROM or performs arithmetic operation on data while giving data to or taking data from a temporary memory device RAM or outputs processed data to an external device, such as the motor M, via an outuput inerface $I_2$, as needed. Inputted to the input interface circuit $I_1$ are such machine source signals as main switch on-off signals, heater temperature stability on-off signals, and preheater switch on-off signals, all from the copying machine, pulse signals from the aforesaid photointerruptor 33 which is a pulse generator, signals from the first through third sensors $SS_1$ through $SS_3$, and on-off signals from the DF switch and on-off switches installed on the upper surface 20 of the copying machine.

Connected to the output interface circuit I₂ through unillustrated converters are the motor M, DF lamp 85, setting lamp 86, jam lamp 87, solenoid clutch 24, solenoid brake 28, solenoids SOL₁ and SOL₂, and prime mover section of the copying machine.

Stored in the temporary memory device RAM are various signals such as wait signal, ready signal, machine source signal, and autostart signal, as well as various data necessary for control.

The operational procedures of the automatic document feeder described in the above embodiment will now be described with reference to the flowcharts shown in FIGS. 8 and the following. The reference characters S1, S2, S3, and so on, which appear in the following description, indicate the step numbers.

Figure 8:
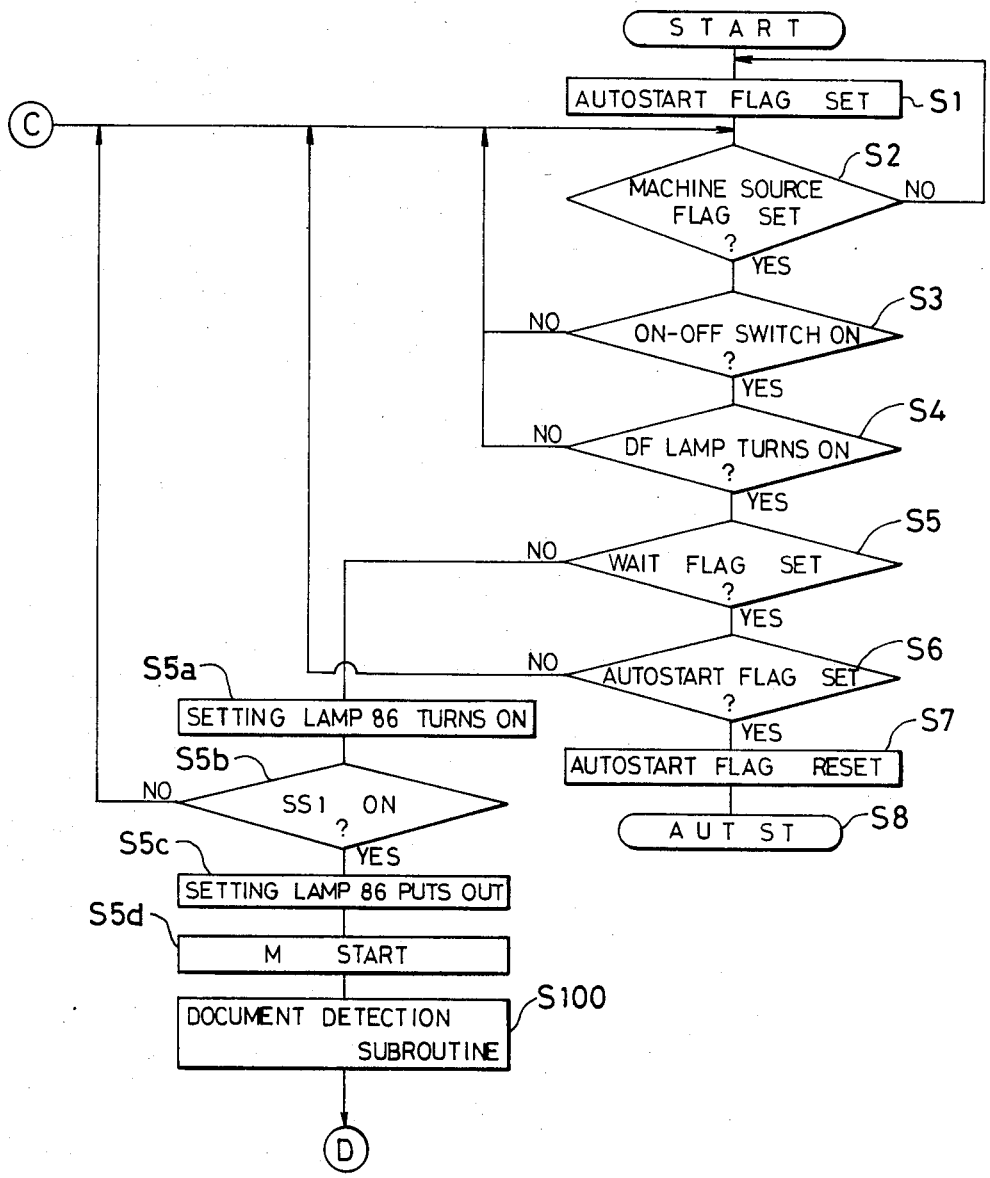

In FIG. 8, when the main switch for driving the copying machine is turned on, the program is started, with the CPU setting the autostart flag, which indicates the document feed state, in the RAM (step S1), and subsequently, at step S2 it makes a check of whether or not the machine source flag is set in the RAM. The machine source flag indicates whether or not preparations for copying operation are made on the part of the copying machine, for example, whether or not the main switch of the copying machine is on, whether or not the heater temperature stability signal is on, and whether or not the preheater switch is on, and it will be set if these conditions are met. Thus, until this flag is set, the process goes in the direction of NO, circulating in the loop of steps S1 and S2.

In the case of YES, it goes to step S3, with the computer making a check of whether or not the aforesaid on-off switch is on, i.e., whether or not the automatic document feeder is closed. If the decision is YES, it goes to the next step S4. In the case of NO, it goes back to step S2.

At step S4, a decision is made as to whether or not the DF lamp 85 is on. The DF lamp 85 is put on when the operator depresses the DF switch 88 on the operator panel 84 once and it is put out when he depresses said DF switch for the second time. Thus, so long as the DF lamp 85 is lit, the operator can confirm that the copying machine is in automatic document feed mode. Now, if the descision is NO, the process goes back to step S2, circulating in the loop of steps S2–S4 unitl the DF switch 88 is depressed. If the DF lamp 85 is lit, the process goes to step S5, with the computer making a check of whether or not the copying machine is in the wait state on the basis of whether or not the wait flag is set.

As described previously, with the heat roller 15 of the fixing device 14 not reaching the predetermined temperature range, the copying machine cannot perform its copy-making operation. Thus, it is so arranged that documents cannot be fed for the constant period of wait time after the copy switch is depressed. A decision as to whether or not it is this wait time is made on the basis of the set or reset state of the wait flag, which is set in the RAM by the CPU on the basis of a signal from the copying machine.

If the wait flag is set, i.e., in the case of YES, at step S6 a check is made of whether or not the autostart flag is set.

Figure 9:
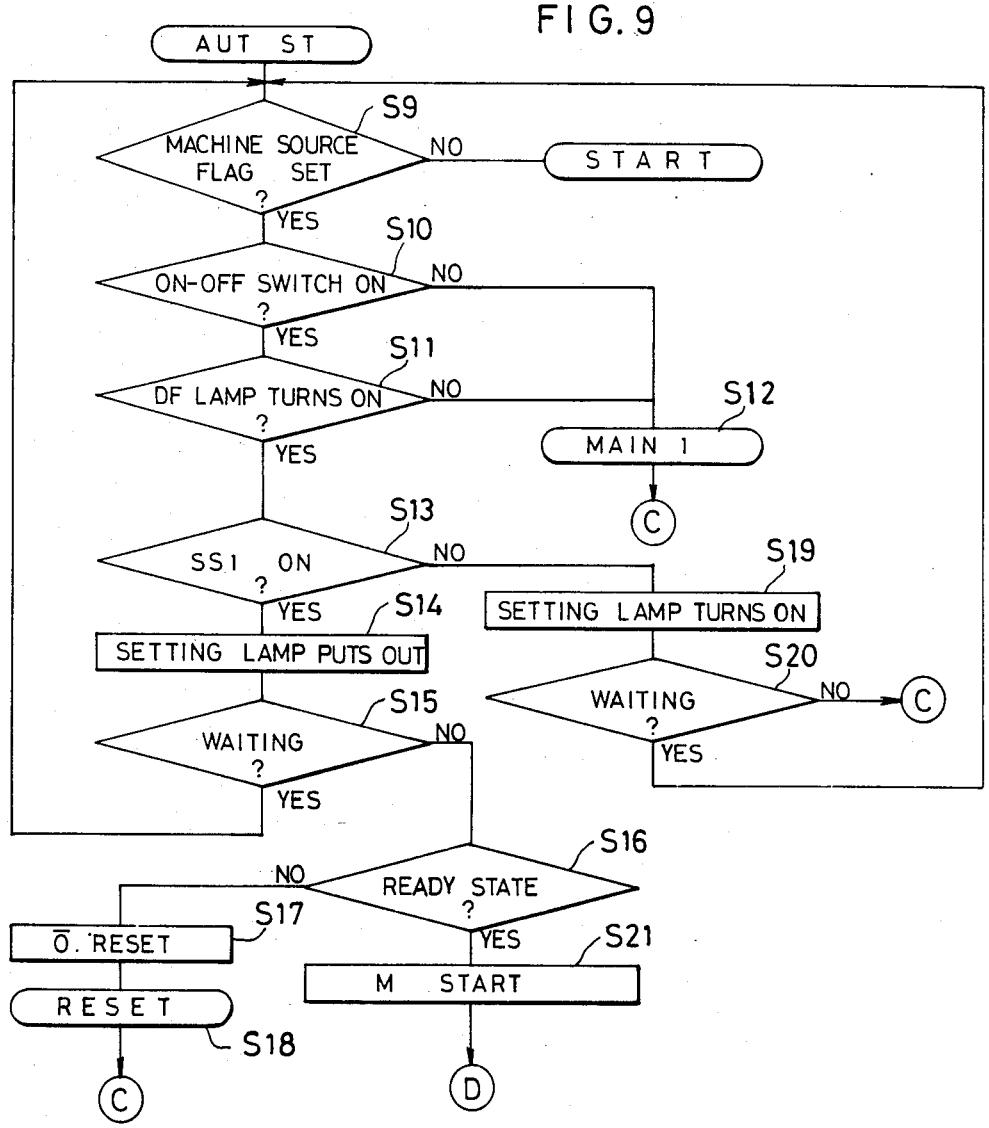

Whenever a copy is made for the first time after the main switch is turned on, the autostart flag has been set at said S1; therefore, the computer advances the process to the next step S7, resetting the autostart flag, and passing through step S8 it continues to perform the procedure shown in FIG. 9.

If the decision at step S5 is NO, since wait time (warm-up time) has already elapsed, the set lamp 86 is turned on at step S5a, with the computer noticing to the operator that preparations for insertion of a document have been made, and at the subsequent step S5b it makes a check of whether or not the first sensor SS₁ is on (i.e., whether or not a document is set in the supply port 89). If documents are not set, it passes the process back to step S2 and waits until documents are set, whereas if they are set, it goes to the next step S5c, putting out the set lamp 86, rotating the motor M (step S5d), and advancing the process to a document detection subroutine shown in FIG. 11 or 12, and procedure shown in FIG. 10.

Further, if the decision at step S6 is NO, the process is also passed back to step S2 to wait until the expiration of the wait time, since the procedure at step S7 has indicated that the copy-making operation is performed for the second or subsequent time after the main switch is turned on.

Step S8 is for the purpose of continuing the process to the procedures shown in FIG. 9. The steps S9 and the following shown in FIG. 9 are special ones to be taken when document feed is effected for the first time after themain switch is turned on. When document feed is to be effected for the second and the following times, the process will follow step S2 through step S5 or S6, a document detection subroutine shown in FIG. 11 or 12, and document feed procedures shown in FIG. 10.

At steps S9, S10, and S11, as in steps S2, S3, and S4, a check is made of whether or not the machine source flag is set, whether or not the on-off switch is on, and whether or not the DF lamp is on, respectively.

At step S9, if the decision is No, this indicates that conditions for copy-making operation on the part of the copying machine are not met; thus, the process goes back to the state shown in FIG. 8. Further, if the decision is NO at steps S10 and S11, the process goes back to step S2 via step S12. In the case where the decision is YES at all steps S9, S10, and S11, a decision is made at step S13 as to whether or not the first sensor SS₁ is on.

In the ready state, as shown in FIG. 5, the large radius arcuate portions 70a of the supply rollers 70 are positioned on the side of the supply roller shaft 51 remote from the press rollers 78; thus, there is a clearance 79 between the supply rollers 70 and the press rollers 78, so that a document inserted through the document supply port 89 (FIG. 5) formed in the cover assembly 17 can be passed thrugh the clearance 79 until they come close to the nip point 90 between the feed rollers 71 and the press rollers 77. At this time, since the motor M is stopped, said document inserted into the clearance 79 can be brought close to the nip point 90 between the feed rollers 71 and press rollers 77 as they are guided between the bottom plate 69 and the document supply tray 72.

Thus, if the decision at step S13 is that the first sensor SS₁ is on, since it has been ascertained that a document is inserted from the document supply port 89 through the clearance 79 to underlie at least the first sensor SS₁, the set lamp 86 requiring insertion of new documents is put out at step S14, and at the subsequent step S15 a check is made of whether or not the wait state has been established. If the wait state is present, the process goes back to the procedure at step S9, circulating in the loop of steps S9 through S15. If the wait state is absent (i.e., in the case of NO), at step S16 a check is made of whether or not the ready state is present.

As for said wait and ready states, they are checked by retrieving information from the RAM (actually, by reference to the flags which are set or reset on the basis of signals from the copying machine). The ready state is checked on the basis of the set flag which is set when the conditions for the copying machine are met; it is set when all conditions for stoppage of the copying machine, such as absence of any of the cassettes 9a through 9c inserted in position, lack of copying paper sheets in a cassette 9 expected to supply paper, and lack of toner, are eliminated. If at step S16 the computer decides that the ready state is absent, it executes step S17 which is a subroutine for blinking the set lamp 86 to report the unsatisfactory condition of the copying machine to the operator. Thereafter, it goes through step S18 to bring the process back to step S2.

At step S13, if the first sensor $SS_1$ is not on, this means that documents have not been inserted; thus, at step S19 the set lamp 86 is lit to command the operator to supply documents. At the subsequent step S20 a decision is made as to whether or not the wait state is present, and if the decision is NO, the process goes back to step S2, whereas in the case of YES, it goes back to step S9 to wait for documents to be set.

If at step S16 the computer decides that the ready state has been established, at step S21 it actuates the solenoid $SOL_1$ to cause the pawl 54 of the lever 58 to engage the ratchet wheel 54 to prevent rotation of the feed roller shaft 44, while starting the motor M.

At this time, the solenoid clutch 24 is on and the solenoid brake 28 if off, and with the start of the motor M, the belt 67 starts to travel, whereupon a subroutine S100 for detection of a document is initiated.

Figure 11:
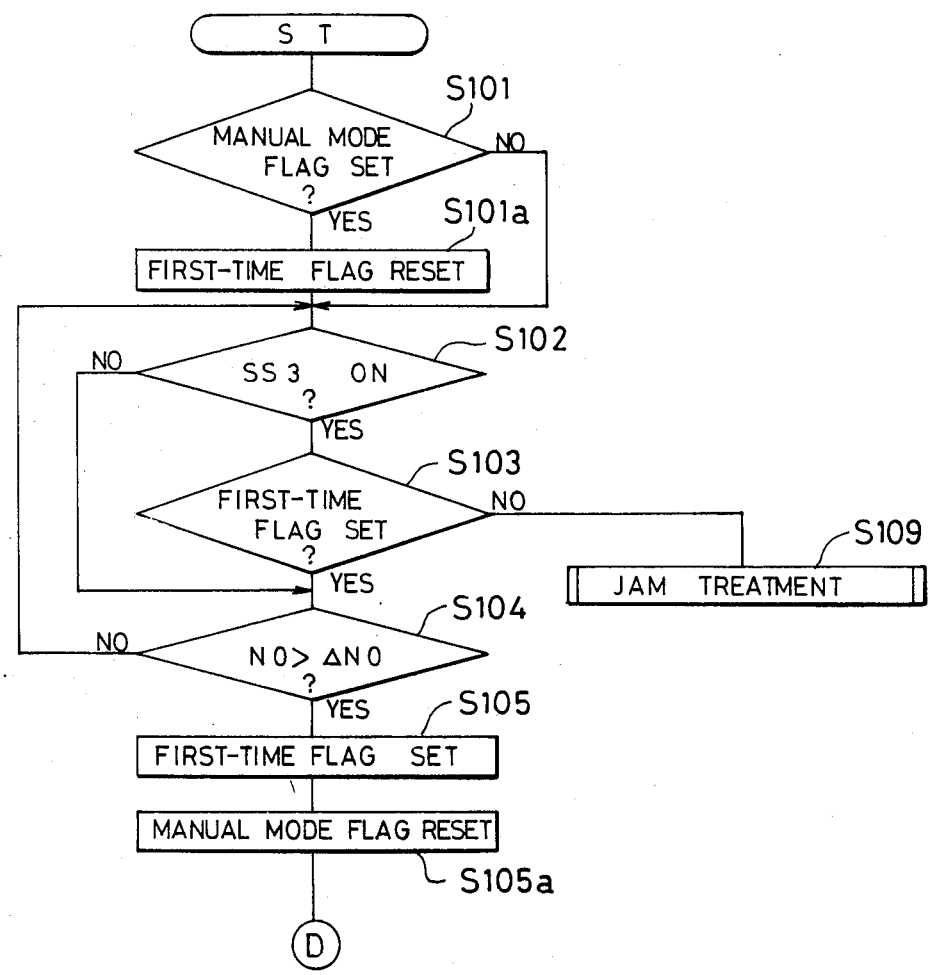

The detail of this document detecting subroutine is as shown in FIG. 11, wherein first a decision is made as to whether or not the manual mode flag is set at step S101. The purpose of the manual mode flag, which is set at step S45a shown in the flowchart of FIG. 13, is to indicate that the preceding copying operation has been performed by manually setting a document, and only in the case of YES, at step S101a the first-time flag in the RAM is reset. The purpose of the first-time flag is to notice to the CPU that after assuming the automatic feed mode state, the docuemnt feeder is ready to feed the firstly inserted document through the document supply port 89 by the operator. At the next step S102, a check is made of whether or not the third sensor $SS_3$ is on. If the decision is NO, the CPU refers to the number $N_o$ of pulse signals from the motor and compares it with a predetermined value $\Delta N_o$ (step S104). The number of said pulse signals is proportional to the rpm of the motor M. Therefore, the number $N_o$ can be set to a little greater value than corresponds to the number of revolutions of the motor M registered from the time the motor M is started to drive the belt 67 till the time a document present at the copy-making position is carried by the belt 67 to the third sensor $SS_3$.

If, therefore, at step S104, $N_o$ is less than $\Delta N_o$, the process circulates in the loop of steps S102–S104, waiting until $N_o > \Delta N_o$. (That is, if there is a document at the copy-making position, it waits for this document to be delivered to the position of the third sensor $SS_3$.) At this time, if there is a document left behind, a decision of YES is given at step S102 before $N_o > \Delta N_o$; at step S103, a check is then made of whether or not the first-time flag is set.

If the first-time flag has been set (in the case of the first copy-making operation, the first-time flag has been set without fail), the process proceeds to step S109 for abnormality treatment such as jam treatment (for example, the CPU stops the motor and lights the jam lamp 87).

In the case of copying the second and subsequent documents, the first-time flag has been set, as is clear from step S105, and the manual mode flag has been reset, as is clear from step S105a; therefore, the process moves from step S103 to step S104, and when $N_o > \Delta N_o$, it moves to step S105, with the CPU setting the first-time flag, and at step S105a it resets the manual mode flag. In the case of copying the second and subsequent documents, since the document delivered is a document suitable for automatic feed, inserted through the document supply port 89 by the operator, there is not trouble caused by the document being discharged to the document discharge roller 81 via the third sensor $SS_3$; thus, abnormality treatment at step S109 will not be performed.

Figure 12:
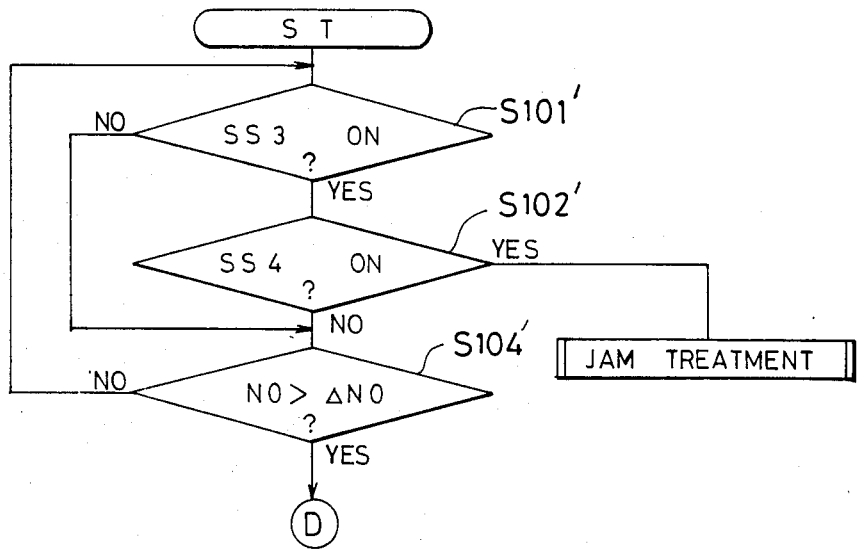

The document detecting subroutine may be constructed in the manner shown in the flowchart of FIG. 12. That is, in FIG. 2 an arrangement may be employed which consists in constantly urging the press roller 68 toward the document platen by an unillustrated spring member while providing a fourth sensor $SS_4$ in the form of a limit switch, photoelectric switch or the like to detect the state of the press roller 68 being raised against the force of the spring member by a document thicker than a predetermined value. Thus, at step S101' a check is made of whether or not the third sensor $SS_3$ is on (corresponding to step S102 in the flowchart of FIG. 11). If the decision is YES, at step S102' a check is made of whether or not the fourth sensor $SS_4$ is on. If the compouter, or the CPU, decides that the fourth sensor $SS_4$ is on, since this means that the thickness of the document on the document platen 2 is greater than the predetermined value, the computer performs abnormality treatment such as jam treatment (corresonding to step S109 in the flowchart of FIG. 11). If the decision is NO at step S101' or step S102', then at step S104' a check is made of whether or not $N_o > \Delta N_o$ (corresponding to step S104 in the flowchart of FIG. 11), and if the decision is NO, the precess circulates in the loop of steps S101'–S104', whereas if it is YES, the process will go through the document feed procedures shown in FIG. 10.

Figure 10:
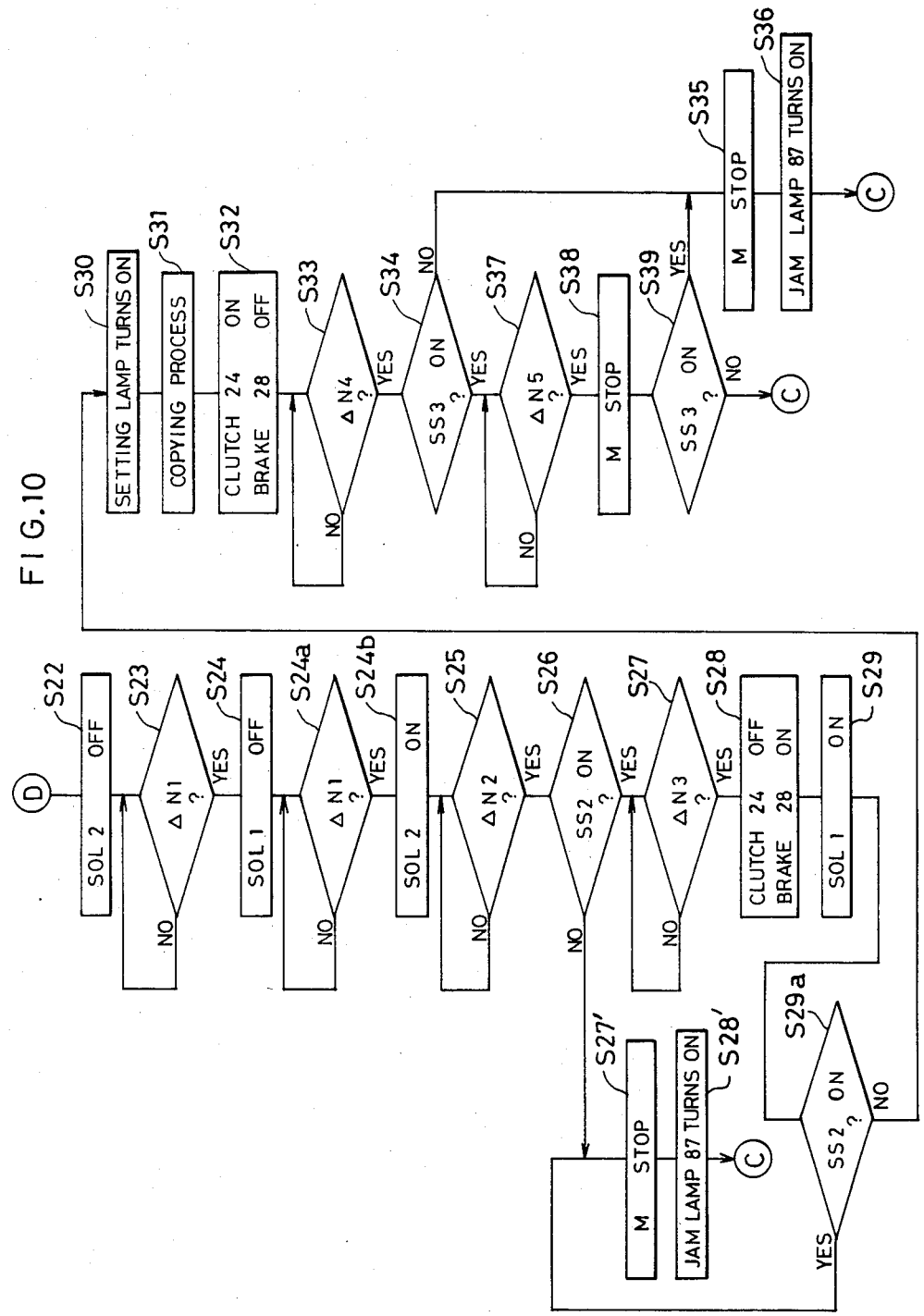

Thereafter, at step S22 shown in FIG. 10, the solenoid $SOL_2$ is brought into the off-state to thereby disengage the locking element 62a of the lever 62 from the pawl 64 of the cam, and the supply roller shaft 51 and supply rollers 70 are rotated by the motor M.

When the motor M is started at step S21, since the clutch 24 is in the on-state, the slitted plate 31 is rotated and the number of slits passing by the photointerrupter 33 is computed by counting the number of pulses inputted from the photointerruptor 33; thus, the number of revolutions N of the motor is found. All the susequent measurements of the number of revolutions of the motor M are made by counting the number of pulses from the photointerrupter 33.

At step S23 a check is made of whether or not since the motor M was started the motor has been rotated by the number of revolutions $N_1$ corresponding to 1.5 revolutions of the supply roller shaft 51. As a result of this amount of rotation, 1.5 revolutions, of the supply rollers 70, the document inserted into the clearance 79 are fed toward the nip point 90, and particularly when the supply rollers 70 have been rotated 1.5 revolutions, the documents are nipped between the large radius arcuate portions 70a of the supply rollers 70 and the press rollers 78, whereby they are fed toward the nip point 90 until the front end of a document is forced into the nip point 90.

Therefore, at this point of time, the CPU sends and off-signal to the solenoid $SOL_1$ to bring the latter into the off-state (at step S24), whereby the pawl 58a of the lever 58 interlocked thereto is disengaged from the ratchet wheel 54, allowing the feed roller shaft 44 to be forcibly rotated by the motor M, so that the document inserted in the nip point 90 between the feed rollers 71 and the press rollers 77 is delivered toward the belt 67.

As a result of the front end of the document being forced into the nip point 90 between the feed rollers 71 and the press rollers 77 which are now stopped, the front end of the document becomes parallel to the feed roller shaft 44, and by rotating the feed rollers 71 in this condition, the direction of travel of the document becomes the same as the direction of travel of the belt 67 indicated by arrow 38, thus eliminating the possibility of deviation of the direction of travel of the document.

When the solenoid $SOL_1$ is turned off at step S24, the CPU goes to step S24a where it waits for the motor M to rotate by an amount $\Delta N_1$. This amount of rotation $\Delta N_1$ determines the amount of rotation of the supply rollers 70 which is registered immediately before the supply rollers 70 are rotated 0.5 revolutions more from the point of time at step S23. At step S24b the solenoid $SOL_2$ is turned on, whereupon the lever 62 is swung to urge its locking element 62a against the cam 63 and the pawl 64 of the cam 63 comes around to engage the locking element 62a of the lever 62, so that the rotation of the cam 63 and supply roller shaft 51 interlocked thereto is stopped at the position shown in FIG. 5.

Subsequently, at step S25, the CPU waits for the motor M to rotate by an amount $\Delta N_2$. This rotation lasts till the lapse of the time required for the front end of the document to pass by the second sensor $SS_2$. If the second sensor $SS_2$ is not turned on even after the lapse of this time, it is surmised that there is a document jam taking place at the feed rollers 71. Thus, if the decision at step S26 is NO, the CPU stops the motor M (step S27'), and at step S28' it lights the jam lamp 87 installed on the operator panel 84 to notice the jam state to the operator, bringing the process back to step S2.

In the case of YES at step S26, the CPU waits at step S27 until the motor M rotates $\Delta N_3$ more. During this amount, $\Delta N_3$, of rotation, the document delivered by the feed rollers 71 and press rollers 77 comes to be inserted between the document platen 2 and the belt 67 driven in the direction of arrow 39a by the belt drive shaft 39 and hence the document is transferred in the direction of arrow 38 by the belt 67 pressed against the document platen 2. This amount or rotation, $\Delta N_3$, represents the amount of rotation necessary for the front end of the thus-transferred document to reach a certain position on the document platen 2. As for said position, in consideration of the nature of copy-making operation, a fixed position (e.g., a position adjacent to the exposure start position) will always be selected.

If the CPU decides at step S27 that a document has been transferred to the predetermined position, at step S27 it turns off the clutch 24 and concurrently turns on the brake 28 (since the brake 28 serves to stop the inertial rotation due to the inertia of the belt drive shaft 39, etc., it has only to be actuated for a very short time, say, 0.5 seconds), to stop the travel of the belt 67.

Subsequently, at step S29 the solenoid $SOL_1$ is turned on, causing the pawl 58a of the lever 58 to engage the ratchet wheel 54, so that the rotation of the feed rollers 71 is stopped.

Since it is surmised that during said $\Delta N_3$ rotation a document is jammed between the feed rollers 71 and the belt drive roller 39, at the subsequent step S29a a check is made of whether or not the second sensor $SS_2$ is on, and if it is on (YES), the CPU goes to said step SD27' to perform a jam treatment, whereas if it is off (NO), the CPU goes to the next step S30.

At this point of time, since the document has been transferred to the position suitable for copying, it follows that the next fresh document may be inserted into the document supply port 89; thus, at step S30 the set lamp 86 is lit and at the subsequent step S31 the CPU sends a copy-making signal to the copying machine; the copying process is thus completed.

When the copying-making operation is thus completed, at step S32 the CPU turns on the solenoid clutch 24, turns off the solenoid brake 28 to drive the belt 67 so as to transfer the document toward the discharge roller 81.

If this document feed action of the belt 67 is in order, it follows that when the motor M has rotated by another amount $\Delta N_4$, the front end of the document reaches the third sensor $SS_3$ to turn on the latter; thus, at step S33 the CPU waits for the period of time corresponding to the number of revolutions $\Delta N_4$, and at the subsequent step S34 it makes a check of whether or not the third sensor $SS_3$ is on.

If the decision is that it is off (in the case of NO), this means that there is a jam such as the document entwining the belt 67; thus, at step S35 the motor M is stopped and the jam lamp 87 is lit (step S36).

If at step S34 the decision is that it is on (in the case of YES), the CPU waits at step S37 for the motor M to rotate by a further amount $\Delta N_5$ and then it stops the motor M (step S38).

The $\Delta N_5$ rotation of the motor M is set to a value such that the trailing end of the document clears the document discharge roller 81. At step S39 a check is made again of whether or not the third sensor $SS_3$ is on, and if it is on (in the case of YES), it is surmised that the document is jammed between the belt driven shaft 66 and the document discharge rollers 81; thus, as before, the stoppage of the motor M and the operation for jam treatment are effected at steps S35 and S36.

In the case of NO at step S39, the CPU goes back to step S2 to be ready for transferring the second and following documents.

The procedures described above refer to the case of inserting document one by one into the document supply port 89. In the above embodiment, however, since sectorial document supply rollers are used at the document supply section, it is possible to insert a plurality of documents in stacked form into the document supply section. Each time the document supply rollers are rotated, the uppermost one of the stacked documents is automatically fed toward the belt feed section. Thus, the invention makes possible both the one-by-one insertion of documents at the operator's will and the fully-automatic document feed in which a plurality of documents are automatically fed one by one.

In the case where the DF lamp 85 is on, i.e., in the case of the automatic document setting mode, all the inserted documents are successively discharged by the document discharge roller after they are copied, so that there is no possibility of a document being left behind.

On the other hand, if a copy-making operation is performed with the DF lamp 85 in the off-state, the belt 67 will not travel and hence there is a possiblity of a document being left behind on the document platen after the copy-making operation is completed.

FIG. 13 show a treatment employed in such case. Consider a case where at step S40 with the DF lamp 85 in the off-state, i.e., in the manual document setting mode, a plurality of operation of copying of a document has been completed.

Then, at step S41, a check is made of whether or not the on-off switch is on. In the case of NO, i.e., when the document feeder is opened, it is surmised that the operator has already removed the document; thus, the chime flag in the RAM is reset (step S42). In the case of YES, at step S43 a check is made of whether or not the DF lamp 85 is on, and if the decision is YES, the document is automatically discharged, so that the chime flag is reset (step S44). In the case of NO, the CPU sets the chime flag in the RAM (step S45) so as to make it known to the copying machine that there is a need for warning the operator of the presence of a document left behind, and the CPU resets the manual mode flag in the RAM (step S45a).

Figure 14:
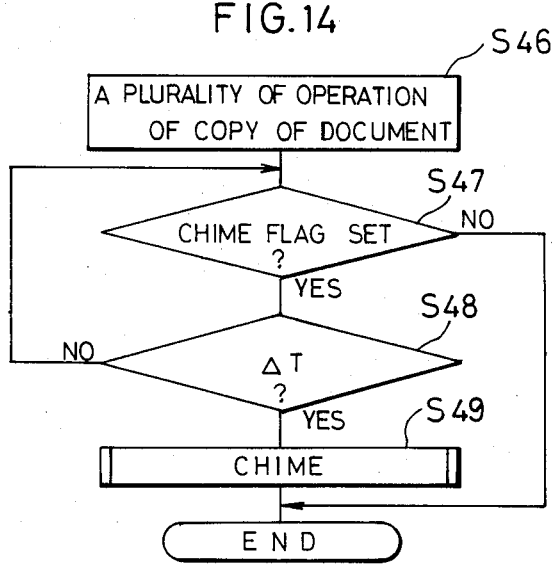

On the other hand, in the control circuit for the copying machine, the chime flag in the RAM is referred to and, as shown in FIG. 14, when a plurality of operation of copying of a document by manual insertion is completed at step S46, a check is made at step S47 of whether or not the chime flag is set. In the case where the DF lamp 85 is on and at step S45 the chime has been set, the CPU waits at step S48 until this state is maintained for a time ΔT. If even after the lapse of the time ΔT, the on-off switch is turned off or the manual document setting mode is not changed to the automatic document setting mode, then the CPU sounds the warning chime at step S49.

In this example, reference has been made to a case where a chime is sounded for warning purposes, but other warning means such as a buzzer may be sounded or simply a lamp may be blinked.

Further, in the above example, a description has been given of a case where the automatic document feeder and the copying machine are individually controlled by separate control devices which interlock each other, but it is also possible to control them by a single microcomputer or the like.

Further, in the above embodiment, a description has been given of a case where when the solenoids SOL₁ and SOL₂ are turned on, the pawl 58a and the locking element 62a engage the ratchet wheel 54 and the pawl section 64, but reversely it may be so arranged that when they are turned off, said engagement takes place to stop the feed roller shaft 44 and the supply roller shaft 51.

As has been described so far, the invention is so designed that when the automatic document setting mode is selected, the presence of absence of a document at a predetermined position in the document feeder is detected so as to drive the document feeder with a predetermined timing. Thus, the setting of a document can be made reliably. Particularly since a document fed to the document supply section is detected and is automatically set upon completion of warm-up, there is no possibility of decreasing the operating efficiency of the operator.

Further, since a document passing through the document discharge section is detected to stop the slide movement of the document, even if a relatively thick document is manually set, it is possible to preclude the danger of the document discharge roller being damaged or jammed with the document.

Further, where the manual document setting mode is selected, a fact that a document is left behind on the document platen for a long time can be noticed.

What is claimed is:

1. An automatic document feeder adapted to automatically feed at least one document to a copying machine having a motor, clutch means for selectively transmitting power from the motor, a document platen, input means for receiving input commands from an operator, display means, and means for providing a warm-up signal for a predetermined time after the copying machine is energized, said document feeder comprising:

means defining an original document path, including a document supply section having supply rollers for advancing a supplied document through the supply section, a belt feed section for receiving the supplied document from the supply section and transferring the document to a predetermined position on the platen, a document discharge section having discharge rollers for receiving the document from the belt feed section and discharging the supplied document from the copying machine, and means attaching at least the belt feed section for pivotal movement between an opened position and a closed position with respect to the platen;

document detecting means for detecting the presence or absence of a supplied document, said detecting means including a first detector for detecting a document at the supply section and providing a first detector signal indicative thereof, and a second detector for detecting a document at the discharge section and providing a second detector signal indicative thereof;

discriminating means for discriminating between manual and automatic document modes in response to an input command at said input means while the belt feed section is in the closed position, said discriminating means generating a first discriminating signal upon closure of said belt feed section and a second discriminating signal upon receipt of a predetermined input from said input means;

a pulse generator for generating signal pulses proportional to the speed of the motor; and control means for controlling said automatic document feeder, said control means including (a) receiving means for receiving said signals from said document detecting means, said discriminating means, said warm-up signal providing means and said pulse generator, and (b) processing means having a counter for counting said pulses received by said receiving means and a calculator for calculating the number of revolutions of the motor and said supply rollers from the count in said counter, said processing means placing said document feeder in the automatic mode upon receipt of said first and second discriminating signals, in said automatic mode said processing means operating said display in response to the presence or absence of said first detector signal, said processing means causing said clutch means to drivingly connect said supply rollers to the motor to rotate said supply rollers a predetermined number of times as calculated by said calculating means upon receipt by said receiving means of said signal from said first detector and the absence of a signal from said warm-up signal providing means, and when the supplied document contacts the belt feed section said controller causes said clutch means to drivingly connect the belt feed section to the motor to position the document on said platen, said controller causing the belt feed section to halt the transport of the document so that the copying machine can copy the document, said controller then causing said belt feed section to resume transport of the document and causing said clutch means to drivingly connect said discharge rollers to the motor, said counter counting the number of pulses received in the time from transport of the document by the belt feed section from the platen to detection of the document by said second detector, said second detector then providing said second signal, said calculator determining the transit time of the document from said pulses counted by said counter, said controller causing said clutch means to drivingly connect the motor and said discharge rollers to discharge the document upon said transit time being less than a prdetermined time, said controller preventing said clutch means from connecting said discharge rollers and the motor and causing an output signal to be displayed at said display whenever said transit time is greater than the predetermined time.

2. An automatic document feeder as set forth in claim 1, wherein said document detecting means includes a third detector for detecting the thickness of a document passing through said document discharge section and providing a third signal whenever the document exceeds a predetermined thickness, said control means stopping the travel of a document in response to said second and third signals from said document detecting means.

3. An automatic document feeder as set forth in claim 1, including means responsive to the expiration of a predetermined time period after closure of said belt feed section, for indicating the prsence of a document in said document path after completion of a copy-making operation in the manual document mode.

4. An automatic document feeder as set forth in claim 1, wherein said control means prevents passage of the supplied document to said belt feed section from said document supply section in response to a document detection signal, indicating the presence of a previously supplied document at said document discharge section, from said second detector.

5. An automatic document feeder as set forth in claim 4, wherein the previously supplied document at said document discharge section may be from said document supply section or a document introduced during the manual document mode.

6. An automatic docment feeder as set forth in claim 5, including means for indicating the interruption of the advance of a document through the original document path.

* * * * *